INVENTORS
WALTER E. BRON
WILLIAM R. HELLER
BENJAMIN WELBER

BY Bernard N. Wiener
ATTORNEY

United States Patent Office 3,452,332
Patented June 24, 1969

3,452,332 MEMORY DEVICE AND METHOD OF INFORMATION HANDLING UTILIZING CHARGE TRANSFER BETWEEN RARE EARTH IONS

Walter E. Bron, Briarcliff Manor, N.Y., William R. Heller, Saratoga, Calif., and Benjamin Welber, Chappaqua, N.Y., assignors to International Business Machines Corporation, New York, N.Y., a corporation of New York Filed Jan. 5, 1965, Ser. No. 423,434
Int. Cl. G11b 7/02; H01j 31/58, 1/63
U.S. Cl. 340—173 24 Claims

ABSTRACT OF THE DISCLOSURE

The invention provides a memory device and method of information handling utilizing a mechanism of reversible electron charge transfer between impurity ions of different rare earth elements in a matrix. There is a reciprocal absorbing and transmitting relationship for ultraviolet radiation of different wavelengths by the ions which participate in the charge transfer mechanism. In particular, the invention provides a memory device and method of information handling utilizing charge transfer between ions of the rare earth elements europium and samarium established on lattice sites of the calcium fluoride ionic crystalline matrix. The information state of the device can be changed by ultraviolet light activation. The state of charge transfer between the ions determines certain characteristic physical properties of the overall impurity-matrix system, e.g., coloration. Illustratively, crystal of $CaF_2$ with $Eu^{2+}$ and $Sm^{3+}$ ions has different ultraviolet absorption bands than with $Eu^{3+}$ and $Sm^{2+}$ ions. In the practice of the invention, ultraviolet radiation of different wavelengths is utilized to produce charge transfer so that either the rare earth ionic configuration of $Eu^{2+}$ and $Sm^{3+}$, or the rare earth ionic configuration of $Eu^{3+}$ and $Sm^{2+}$, is obtained in the calcium fluoride crystalline matrix. An absorption detectable physical mode and a fluorescence detectable physical mode are utilized to determine the information state by determining non-destructively which one of two rare earth ionic configurations is present in the matrix.

Figure 1A:
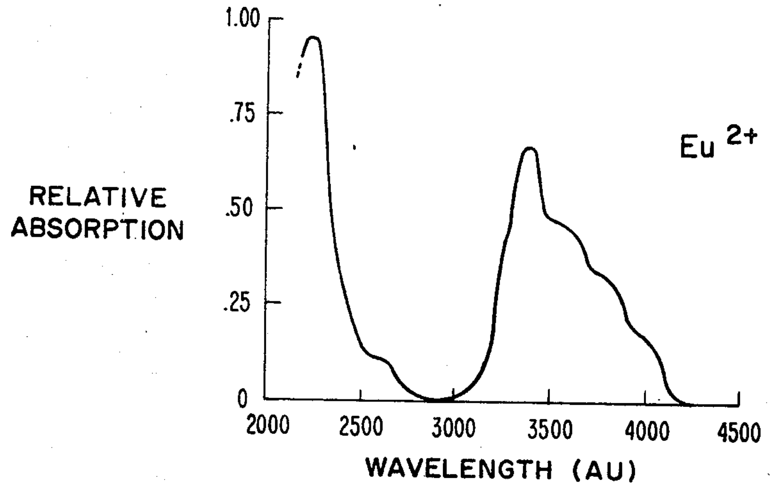

This invention relates generally to charge transfer between ions in a matrix and it relates more particularly to bistable electron charge transfer between rare earth ions of different elements in an ionic crystalline matrix.

Electron charge transfer occurs between two impurity ions, e.g., two different rare earth ions, in a host matrix when energy imparted to one of them causes an electron to become dissociated therefrom with sufficient kinetic energy to overcome the potential barrier between the ion and another ion in the matrix. This results in the capture of the electron by the ion of the other element, thereby changing its valence state. A crystalline solid, amorphous solid, or liquid may be the host matrix in which the impurity ions are disposed. The matrix itself does not participate in the charge transfer mechanism except to allow the passage of the electrons effecting the charge transfer. The state of charge transfer between the ions determines characteristic physical properties of the overall impurity-matrix system, e.g., coloration. A crystal of $CaF_2$ containing $Eu^{2+}$ and $Sm^{3+}$ ions has different absorption bands than if it contained $Eu^{3+}$ and $Sm^{2+}$ ions. In the practice of the invention, ultraviolet radiation of different wavelengths is utilized to produce charge transfer so that either the configuration $Eu^{2+}$ and $Sm^{3+}$, or the configuration $Eu^{3+}$ and $Sm^{2+}$, is obtained in the calcium fluoride ionic crystalline matrix.

The prior art has provided semiconductor crystalline matrices doped with rare earth ions in which reversible charge transfer was obtained through infrared and thermal activations. Further, there have been insulator crystalline matrices doped with rare earth ions in which charge transfer effected by ultraviolet radiation is reversed by thermal activation. Thermal activation is undesirable for a memory device because it imposes mechanical stresses thereon leading to its deterioration.

Ultraviolet radiation is extremely important for operation of a memory device utilizing charge transfer as it does not significantly heat the matrix while effecting the change in color. It has been demonstrated in the prior art that there exist materials with which reversible charge transfer could be obtained solely with ultraviolet radiation. The practice of the invention is carried out with a material wherein reversible change of state is obtained with ultraviolet radiation. Therefore, the disadvantageous mechanical stress entailed by the practice of the prior art is eliminated.

It is an object of this invention to provide a memory device and method of information handling utilizing reversible electron charge transfer between local regions in a matrix having electronic configurations for absorbing and transmitting light.

It is another object of this invention to provide a memory device and method of information handling utilizing reversible electron charge transfer between impurity ions established in a matrix.

It is another object of this invention to provide a memory device and method of information handling utilizing reversible electron charge transfer between rare earth ions established in a matrix.

It is another object of this invention to provide a memory device and method of information handling utilizing electron charge transfer between rare earth ions established on lattice sites of a crystalline matrix.

It is another object of this invention to provide a memory device and method of information handling utilizing reversible electron charge transfer between rare earth ions established in an ionic crystalline matrix.

It is another object of this invention to provide a memory device and method of information handling utilizing reversible electron charge transfer between rare earth ions established in a insulator matrix.

It is another object of this invention to provide a memory device and method of information handling utilizing reversible electron charge transfer between rare earth ions established on the lattice sites of an insulator crystalline matrix.

It is another object of this invention to provide a memory device and method of information handling utilizing reversible electron charge transfer between rare earth ions established in a fluoride ionic crystalline matrix.

It is another object of this invention to provide a memory device and method of information handling utilizing reversible electron charge transfer between rare earth ions europium and samarium established on the lattice sites of a calcium-fluoride ionic crystalline matrix.

Figure 2:
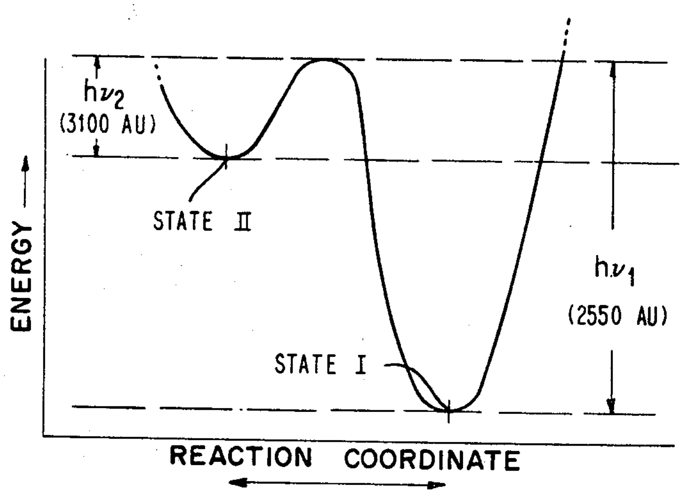

FIG. 2 is a line diagram illustrating the two potential whether in the visible, the ultraviolet, or the infrared region of the electromagnetic spectrum, will be referred to as "light" or "optical wavelength." This conforms to conventional technical usage, e.g., as found in the International Dictionary of Physics and Electronics, published in 1956 by Van Nostrand Co., Inc. of New York City. The term "ray" as used herein includes both "electromagnetic radiation" and "electron beam" insofar as either effects a change in charge transfer between the rare earth ions in a memory device for the practice of this invention.

The foregoing and other objects, features and advantages of the invention will be apparent from the following more particular description of preferred embodiments of the invention as illustrated in the accompanying drawings.

Figure 1B:
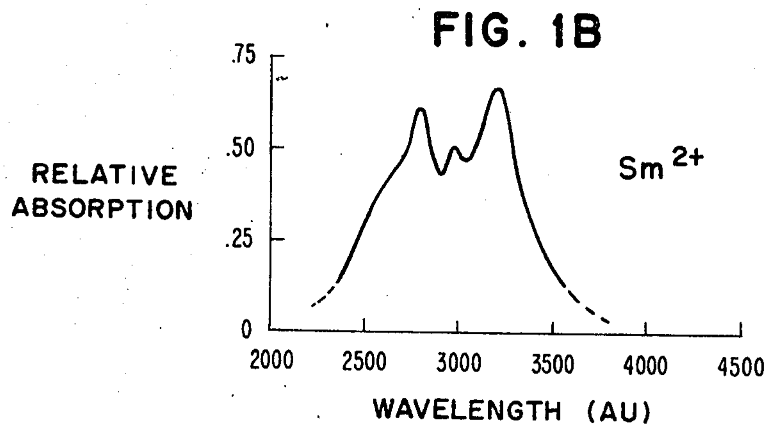

In the drawings:

FIGS. 1A and 1B are idealized graphs showing portions of the absorption spectra of $Eu^{2+}$ and $Sm^{2+}$ illustrating that a minimum of the absorption curve for $Eu^{2+}$ occurs at a maximum of the absorption curve for $Sm^{2+}$, i.e., $Eu^{2+}$ and $Sm^{2+}$ are reciprocally absorbing and transmitting at a particular frequency. In the particular spectral region shown in FIG. 1, $Eu^{3+}$ and $Sm^{3+}$ do not absorb significantly.

FIGG. 2 is a line diagram illustrating the two potential energy valleys with barrier therebetween for the reversible transformations $$Eu^{2+}+Sm^{3+}+h\nu_1\rightarrow Eu^{3+}+Sm^{2+}$$

and $$Eu^{3+}+Sm^{2+}+h\nu_2\rightarrow Eu^{2+}+Sm^{3+}$$

Figure 3:
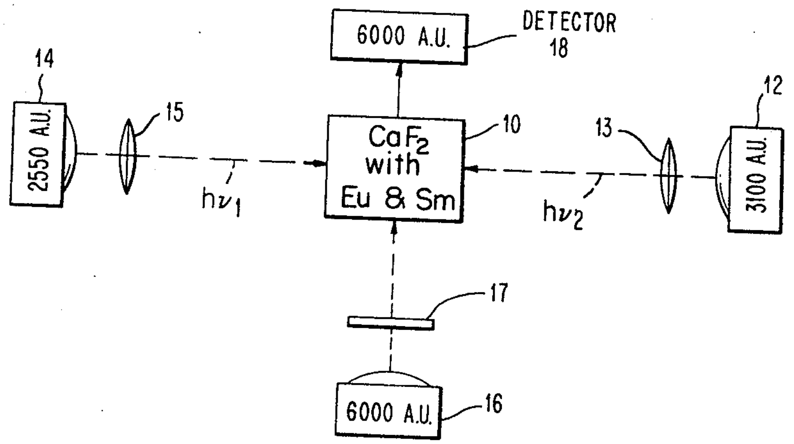

FIG. 3 is a line diagram exemplifying the practice of invention with an embodiment thereof in which the state of charge transfer in a calcium-fluoride ionic crystalline matrix doped with europium and samarium rare earth ions is detected through the absorption of light of 6,000 angstrom units wavelength.

Figure 4:
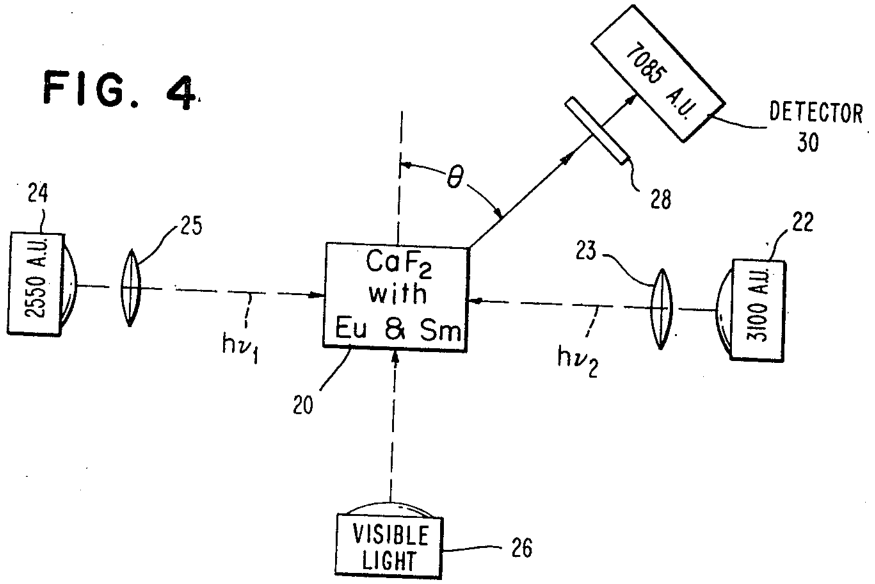

FIG. 4 is a line diagram exemplifying the practice of this invention with an embodiment thereof in which the state of charge transfer in a calcium-fluoride ionic crystalline matrix doped with rare earth europium and samarium ions is detected through fluorescence radiation of 7085 angstrom units wavelength through absorption of incident light in the shorter wavelength optical absorption bands of $Sm^{2+}$.

Figure 5:
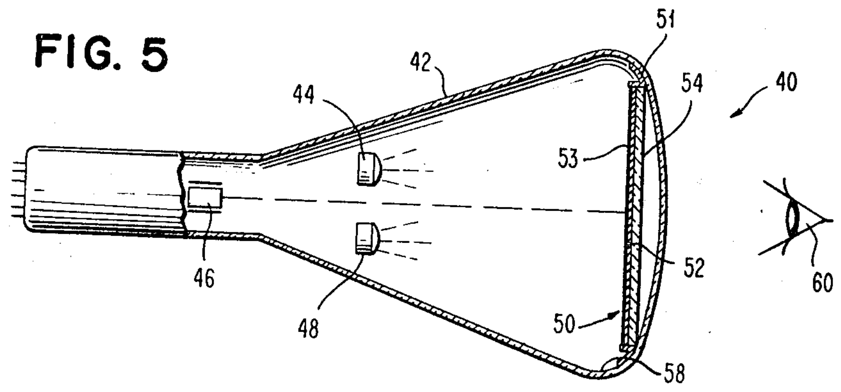

FIG. 5 illustrates the practice of this invention with an embodiment thereof in which a calcium-fluoride crystalline matrix doped with ions of the rare earth europium and samarium is utilized as the active surface of the screen of a dark trace cathode-ray tube.

Broadly, the invention provides a memory device and method of information hadling utilizing a mechanism of reversible electron charge transfer between local regions of electronic configuration in a matrix, e.g., ions of different atoms in a matrix. Each atom has an ion with characteristic absorbing and transmitting property at a particular frequency. There is a reciprocal absorbing and transmitting relationship for radiation by the ions which participate in the charge transfer mechanism. For example, where an ion of one atom type absorbs light, that same light is transmitted by an ion of the other element type, and with the other frequency of light used in the charge transfer, the ion formerly absorbing now transmits and vice versa. In particular, the invention provides a memory device utilizing charge transfer between ions of the rare earths europium and samarium established on lattice sites of the calcium-fluoride ionic crystalline matrix. The configuration or state of the device can be changed by ultraviolet light activation. An absorption operational mode or a fluorescent operational mode is utilized for determining non-destructively the presence of a particular state of electron charge transfer.

In the practice of an aspect of this invention, an insulating ionic crystalline matrix doped with rare earth ions is established as the active surface of the screen of an electron beam dark trace tube and the charge transfer process is utilized for information storage and retrieval, i.e., inforation handling.

PHYSICS OF INVENTION

The following are illustrative background references for the practice of this invention: Physical Review 111, page 1533 (1958), S. P. Keller et al.; Optics and Spectroscopy 12 (1962), page 272, P. P. Feofilov et al.

A rare earth ion in the conventional Table of Periodic Properties of the Elements exists with atomic numbers 58 to 70 and each has an incomplete $4f^n$ inner electron shell for which there is a series of sharp and well defined energy levels which give rise to sharp spectral lines (of the order of 1 AU) in both absorption and fluorescence modes.

There are also much broader (width of the order of 100 AU) absorption bands with relatively higher oscillator strength than the sharp lines of the $4f^n$ inner electron shell. The broad absorption bands are relatively intense, i.e., the absorption (emission) cross-section per ion is relatively large. This means that for a relatively small concentration of rare earth ions in a host matrix, large effects can be obtained with a practical intensity of incident ultraviolet radiation.

Irraditiaon of a $CaF_2$ crystalline matrix containing $Eu^{2+}$ and $Sm^{3+}$ ions with ultraviolet light having wavelength in the neighborhood of 2300 AU causes electrons to be transferred from $Eu^{2+}$ to $Sm^{3+}$ ions according to the reaction $$Eu^{2+}+Sm^{3+}+h\nu_1\rightarrow Eu^{3+}+Sm^{2+}$$

It has been determined for the practice of this invention that ultraviolet radiation of 2550 AU is satisfactory for $h\nu_1$.

The absorption spectrum of $Sm^{2+}$ is characterized by a series of broad intense optical absorpiton bands extending from 7000 angstrom units into the ultraviolet region. One of these bands is centered at about 3100 AU and irradiation of the $Sm^{2+}$ ions with ultraviolet radiation of approximately that wavelength causes them to absorb energy in this region according to the reaction $$Eu^{3+}+Sm^{2+}+h\nu_2\rightarrow Eu^{2+}+Sm^{3+}$$

A similar reversal reaction exists for any other pair of ions A and B in an appropriate matrix for which $B^{N+}$ has a strong absorption band in the region where $A^{N+}$ transmits such that electrons are readily transferred between A and B. Illustratively, the following are conditions: $A^{2+}$ absorbs srtongly where $B^{3+}$ absorbs weakly; $A^{3+}$ absorbs weakly where $B^{2+}$ absorbs strongly; and $A^{2+}$ absorbs strongly where $B^{2+}$ absorbs weakly, and vice versa. Illustratively, the crystalline matrices of $SrF_2$ and $BaF_2$ are satisfactory for the practice of this invention when doped with europium and samarium. It is known that impurity ions will be located on lattice sites when the ion replaces one with approximately the same ionic radius. Both europium and samarium have ionic radii approximately the same as that of divalent calcium ion.

With reference to FIG. 1, $Eu^{2+}$ has two strong absorption bands in the ultraviolet centered at approximately 2300 AU and 3500 AU with a marked minimum at about 3100 angstrom units. In contrast, $Sm^{3+}$ ions have negligible absorption in the ultraviolet and visible regions, but within the range 2300 AU–4000 AU, $Sm^{2+}$ has an absorption band centered at approximately 3100 AU.

For illustrative purpose, consider that europium (Eu) and Samarium (Sm) ions are initially present in a calcium-fluoride ($CaF_2$) crystalline matrix in the valance states $Eu^{2+}$ and $Sm^{3+}$ (FIG. 1A). When a quantum of approximately 2550 angstrom units ultraviolet radiation is absorbed by a $Eu^{2+}$ ion, an electron is detached therefrom with sufficient energy to permit it to become trapped at a $Sm^{3+}$ ion which, as a result, becomes a $Sm^{2+}$ ion. A $Sm^{3+}$ ion situated on a substitutional $Ca^{2+}$ lattice site without local charge compensation is a very efficient electron trap because of the Coulomb attraction which it exerts on the electron which has been detached from an $Eu^{2+}$ ion. There is local charge compensation when a trivalent ion on a divalent lattice site has already attracted to its vicinity a negative charge to effect a total divalence.

The removal of the local charge compensation may be accomplished by heat treatment. By control of the oxidizing-reducing conditions during growth of the doped $CaF_2$ crystal, europium atoms are initially established on lattice sites of $CaF_2$ in the divalent state $Eu^{2+}$ and the samarium atoms are initially established on lattice sites in the trivalent state $Sm^{3+}$. Because $Eu^{2+}$ has a $4f$ half-filled electron shell, it is easily established on the lattice sites in the divalent state and the reducing condition need not be severe. If approximately equal amounts of europium and samarium are employed, the resulting crystal will contain primarily $Eu^{2+}$ and $Sm^{3+}$. In an illustrative heat treatment, the $CaF_2$ is maintained at approximately 1100° C. for at least two hours and quenched appropriately to room temperature maintaining the optical quality of the crystal. If $F^-$ interstitials are used to establish charge neutrality, they are dissociated from the $Sm^{3+}$ ions at relatively high temperature and local charge compensation is avoided since the quench "freezes" the $F^-$ interstitials in remote positions from the $Sm^{3+}$ ions. Consequently, the $F^-$ interstitials do not interfere with the charge transfer process between europium and samarium ions.

The energy vs. reaction coordinate curve of FIG. 2 illustrates the potential valley relationships between the configuration $Eu^{3+}+Sm^{2+}$ and the configuration $Eu^{2+}+Sm^{3+}$ in a crystalline matrix. The configuration $Eu^{3+}+Sm^{2+}$ is at the minimum of the metastable shallower potential valley (state II) and the configuration $Eu^{2+}+Sm^{3+}$ corresponds to the stable deeper potential valley (state I). Both state I and state II must be relatively stable configurations, i.e., a metastable state with relatively long lifetime is considered to be "stable" for the practice of this invention. Radiation of energy $h\nu_1$ changes the energy level from state I to state II. Radiation of energy $h\nu_2$ is required to transfer the state from state II to state I. The proportion of the total rare earth ions of europium and samarium in the $Eu^{2+}+Sm^{3+}$ configuration which transfer to the $Eu^{3+}+Sm^{2+}$ configuration may be small compared to the total number of $Eu^{2+}$ ions in the crystal, but even with a small number of charge transfers, the macroscopic coloration and erasure is sufficient for practice of the invention.

Room temperature operation is satisfactory for the practice of this invention. However, it has been determined that low temperature operation, e.g., 4° K., enhances the intensity of the fluorescence signal observed by the detector by several orders of magnitude compared to that at room temperature. However, the difference in absorption at 4° K. and room temperature is not of practical significance.

PRACTICE OF THE INVENTION

The practice of this invention with a memory device utilizing charge transfer and operated in the absorption mode will be described with reference to FIG. 3. A crystal of $CaF_2$ doped with $Eu^{2+}$ and $Sm^{3+}$ ions is established in light receiving relationship with ultraviolet radiation sources 12 and 14 via focusing lenses 13 and 15, respectively, and conventional light deflection means, not shown. Sources 14 and 12 provide quanta of ultraviolet radiation having energies $h\nu_1$ and $h\nu_2$, respectively, with maximum intensities at approximately 2550 angstrom units and 3100 angstrom units. Sources 12 and 14 irradiate the same local region of crystalline matrix 10 for a particular bit of stored information. Source 16 of 6000 angstrom units wavelength radiation in the visible spectrum is established in reading relationship with crystal 10 via filter 17. Source 16 may be a tungsten lamp and filter 17 is a broad band transmission filter which passes radiation centered at 6000 AU. The source 12 may be conveniently a mercury vapor lamp with a filter having maximum transmission at the wavelength of the mercury emission line at 3100 AU, and the source 14 may conveniently be another mercury vapor lamp having a filter with maximum transmission at the wavelength of the mercury resonance line at 2550 AU. The uncolored state of crystal 10 is termed "state I" and colored state is termed "state II" which appears greenish. The apparent greenish coloration results from the absorption band of $Sm^{2+}$ ions near 6000 angstrom units wavelength. In the operation of the embodiment of FIG. 3, a pulse of ultraviolet light of 2550 AU effects a greenish coloration of the crystal 10 because it causes the state II. As the crystal 10 in state II absorbs strongly at 6000 AU in the visible spectrum, detector 18 detects the presence of the coloration by a change in intensity of its output signal. Illustratively, detector 18 may incorporate a photosensitive diode or a photomultiplier.

If the pulse $h\nu_1$ is not of sufficient intensity and duration to produce the maximum greenish coloration of crystal 10, a further pulse from source 14 will increase the coloration but it will not be registered by detector 18 if it is suitably biased. When the detector 18 is suitably biased, a change of state of crystal 10 causes a reading to be obtained, but electron charge transfer above a threshold does not change the reading. The maximum amount of obtainable greenish coloration of crystal 10 depends only on the total number of $Sm^{2+}$ ions present in the crystal lattice. More precisely, the change in optical density of the crystal for light in the region of the $Sm^{2+}$ absorption band is proportional to the number of $Sm^{2+}$ ions in the lattice.

State II is retained by the crystal 10 until an $h\nu_2$ pulse is applied which must be sufficiently intense to erase at least the saturation greenish coloration of matrix 10; the required intensity of the pulse $h\nu_2$ depends only on the total number of the europium and samarium atoms in the calcium-fluoride crystal 10. The intensity levels of the ultraviolet radiation for operation of the embodiment of FIG. 3 are readily selected by conventional techniques.

The nature and operation of a second embodiment of this invention will be described with reference to FIG. 4 which illustrates a memory device utilizing charge transfer with operation in the fluorescence mode. $Sm^{2+}$ ions have a characteristic intense sharp line fluorescence at the precise wavelength 7085 AU which is excitable by light of any wavelength less than 7085 and lying in the absorption bands of $Sm^{2+}$. As room temperature is approached from lower temperatures, the sharp line fluorescence broadens into a broad band of red fluorescence which is excitable by light of any wavelength less than 7085 AU and lying in the absorption bands of $Sm^{2+}$. Crystal 20 is stimulated by $h\nu_1=2550$ AU radiation from source 22 via light focusing lens 25 and a conventional light deflection means, not shown, to establish state II from state I and by $h\nu_2=3100$ AU radiation from source 24 via light focusing lens 23 and conventional light deflection means, not shown, to establish state I from state II. Sources 22 and 24 irradiate the same local region of crystalline matrix 20 for a particular bit of stored information. Source 26 provides visible wavelengths shorter than 7085 AU and may conveniently be a tungsten lamp. Detector 30 responds to radiation of 7085 AU wavelength and is disposed at an appreciable angle $\theta$ from the light path from source 26 to preclude light transmitted by crystal 20 directly from source 26. A narrow pass filter 28 for 7085 AU is placed between crystal 20 and detector unit 30 to minimize further any optical noise at detector 30. In operation, detector unit 30 registers an output signal after a pulse of $h\nu_1$ from unit 22 is transmitted to crystal 20 to obtain state II because of the fluorescence signal at 7085 AU indicative of the state II. Additional $h\nu_1$ pulses increase the amplitude of the signal from detector unit 30 unless it is suitably biased. Under certain circumstance of operation, detector 30 has a quantitative response charactertistic and may not be so biased if a measure of total possible coloration of crystal 20 is desired.

Erasure of the state II of crystal 20 is obtained by a pulse of $h\nu_2$ radiation from unit 24 of sufficient magnitude to effect the requisite electron charge transfers. For doping levels of approximately 0.1 mole percent of europium and samarium atoms in a calcium fluoride crystalline matrix, the charge transfer process has a "penetration depth" of approximately 0.002 inch, i.e., half the coloration is produced within this distance from the surface of the crystal facing the source of $h\nu_1$. The coloration of the crystal $CaF_2$ doped with Eu and Sm due to the charge transfer effect is detectable in small surface areas and a large number of memory elements may be established within a small area, the only limitation being in principle the diffraction limit of optics, i.e., approximately $10^{-8}$ sq. cm. The density of memory bits is limited only by the size of the focus of the beams of $h\nu_1$ and $h\nu_2$. The noted parameters of penetration depth and surface area are merely exemplary as sensitive detectors and precise focusing of $h\nu_1$ and $h\nu_2$ permit solution of varied operational requirements.

A third embodiment of this invention will be described with reference to the dark trace cathode-ray tube 40 of FIG. 5. Tube 40 has envelope 42 within which are situated a source 44 of 6000 AU visible light, an electron gun with associated electron-beam deflecting electrodes 46, and source 48 of ultraviolet radiation of 3100 AU wavelength ultraviolet radiation. Screen 50 has active material 52 $CaF_2$ doped with europium and samarium ions as described hereinbefore on a substrate 54, e.g., mica. Screen 50 is attached to envelope 42 by brackets 56 and 58. A grounded thin metallic layer 53, e.g., aluminum, is established on active material 52 between it and gun 46 so that free electrons may be conducted away. In operation, analog or alpha-numeric information is presented to electron gun and electrodes 46 in a conventional manner. The information is transmitted to screen 50 when the electrons from the gun 46 cause a change to state II from state I. The source 44 of 600 AU visible light is turned on to permit information stored on screen 50 to be read by an observer 60 as dark green traces against a semi-opaque white background. To erase the dark trace image on screen 50, the source 48 of 3100 AU ultraviolet light is excited and the screen 50 is irradiated. The time required to establish the dark trace on screen 50 is dependent upon the intensity of the coloration required and the intensity of the electron beam, i.e., for a greater coloration a greater time is required and for a greater intensity of the electron beam, a lesser time is required. Adjustment of the operational parameters is readily accomplished by conventional technique.

The dark trace tube 40 of FIG. 5 is completely stable at room temperature and ambient light conditions. The heating requirement for prior art dark trace tubes to erase a dark trace tended to deteriorate their active material and limit severely the number of cycles of available operation. Such a limitation is not imposed on the operation of the dark trace tube 40. Other sources for coloration such as X rays or ultraviolet light of approximately 2550 AU wavelength, not shown, may be utilized in accordance with conventional techniques for writing on the surface 52 in place of the electron beam from electron gun 46.

GENERAL PRACTICE OF INVENTION

If A and B are ions of different atoms established in a matrix, the practice of this invention may be implemented according to the reversible oxidation—reduction reactions $$A^n + B^m \underset{h\nu_2}{\overset{h\nu_1}{\rightleftharpoons}} A^{n-1} + B^{m+1}$$

if the spectra of A and B in their different valence states are different and there are regions of reciprocal absorption and transmission of radiation. The excitation by the radiation $h\nu_1$ or $h\nu_2$ must be to some state which allows ionization of an electron to a charge transfer state or to one permitting tunneling of the electron to the second ion.

Single impurity ions, cluster of impurity ions, and electron populated defects in a matrix can participate in electron charge transfer, and the practice of this invention broadly includes them. Thus, an ion cluster, e.g., of three different types of ions, may have the property of a single impurity ion in the electron charge transfer mechanism. Such a local region having an electronic configuration to provide an electron or act as a trap for one is adequate. Similarly, the presence of lattice defects which are sinks for and sources of electrons are suitable for the electron charge transfer mechanism utilized in the practice of the invention.

An embodiment of this invention wherein coloration of a matrix is obtained by an electron beam may conveniently utilize phosphors in the matrix to enhance the efficiency of electron charge transfer. The phosphor is one which exhibits ultraviolet radiation of energy $h\nu_1$ when stimulated by an electron beam and may be used as an independent layer or be incorporated in the matrix with suitable conventional binder.

Since an embodiment of this invention is operable without requirement for vacuum due to the use of light sources, advantageous applications can be made thereof.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Method of information handling by transferring electron charge reversibly between impurity ions of two different rare earth elements capable of being established as two different rare earth ionic configurations at local regions in a matrix, comprising the steps of:
   irradiating a portion of said matrix with a first ultraviolet beam for transferring electron charge from ions of one of said rare earth elements to ions of the other rare earth element by the absorption of said first ultraviolet beam to establish one information state in said portion of said matrix by establishing one of said two rare earth ionic configurations therein; and
   irradiating said portion of said matrix with a second ultraviolet beam of different energy for transferring electron charge from said ions of the other rare earth element to said ions of said one rare earth element by absorption of said second ultraviolet beam to establish another information state in said portion of said matrix by establishing the other of said two rare earth ionic configurations therein.

2. Method as set forth in claim 1 wherein said rare earth elements are europium and samarium.

3. Method as set forth in claim 2 wherein said transfer of electron charge by said first ultraviolet beam occurs according to $$Eu^{2+} + Sm^{3+} + h\nu_1 \rightarrow Eu^{3+} + Sm^{2+}$$

and said transfer of electron charge by said second ultraviolet beam occurs according to $$Eu^{3+} + Sm^{2+} + h\nu_2 \rightarrow Eu^{2+} + Sm^{3+}$$

where $h\nu$ and $h\nu_2$ represent photons of said first and second ultraviolet beams respectively.

4. Method according to claim 2 wherein said matrix is a calcium fluoride crystalline matrix.

5. Method according to claim 4 wherein said first ultraviolet beam is approximately 2550 angstrom units and said second ultraviolet beam is approximately 3100 angstrom units.

6. Method according to claim 1 including the step of irradiating said portion of said matrix with an electromagnetic wavelength to activate a detectable physical mode therein.

7. Method according to claim 6 including the step of detecting said physical mode in said portion of said matrix to determine the information state therein by determining which one of said two rare earth ionic configurations is present therein.

8. Method as set forth in claim 6 wherein said rare earth elements are europium and samarium and said matrix is calcium fluoride.

9. Method as set forth in claim 7 wherein said physical mode is an absorption mode.

10. Method as set forth in claim 7 wherein said physical mode is a fluorescence mode.

11. Memory apparatus for information handling by transferring electron charge reversibly between impurity ions of two different rare earth elements capable of being established as two different rare earth ionic configurations at local regions in a matrix, comprising:

means to irradiate a portion of said matrix with a first ultraviolet beam for transferring electron charge from ions of one of said rare earth elements to ions of the other rare earth element by the absorption of said first utlraviolet beam to establish one information state in said portion of said matrix by establishing one of said two rare earth ionic configurations therein; and means to irradiate said portion of said matrix with a second ultraviolet beam of different energy for transferring electron charge from said ions of the other rare earth element to said ions of said one rare earth element by absorption of said second ultraviolet beam to establish another information state in said portion of said matrix by establishing the other of said two rare earth ionic configurations therein.

12. Memory apparatus according to claim 11 wherein said rare earth elements are europium and samarium.

13. Memory apparatus according to claim 12 wherein said transfer of electron charge by said first ultraviolet beam occurs according to $$Eu^{2+}+Sm^{3+}+h\nu_1 \rightarrow Eu^{3+}+Sm^{2+}$$

and said transfer of electron charge by said second ultraviolet beam occurs according to $$Eu^{3+}+Sm^{2+}+h\nu_2 \rightarrow Eu^{2+}+Sm^{3+}$$

where $h\nu$ and $h\nu_2$ represent photons of said first and second ultraviolet beams respectively.

14. Memory apparatus according to claim 12 wherein said matrix is a calcium fluoride crystalline matrix.

15. Memory apparatus as set forth in claim 12 wherein said first ultraviolet beam is approximately 2550 angstrom units and said second ultraviolet beam is approximately 3100 angstrom units.

16. Memory appartaus according to claim 11 including means to irradiate said portion of said matrix with an electromagnetic wavelength to activate a detectable physical mode therein.

17. Memory apparatus according to claim 16 including means to detect said physical mode in said portion of said matrix to determine the information state therein by determining which one of said two rare earth ionic configurations is present therein.

18. Memory apparatus as set forth in claim 17 wherein said detectable physical mode is an absorption mode.

19. Memory apparatus as set forth in claim 18 wherein said rare earth elements are europium and samarium, said matrix is calcium fluoride and said absorption mode is at approximately 6000 angstrom units.

20. Memory apparatus as set forth in claim 17 wherein said detectable physical mode is a fluorescence mode.

21. Memory apparatus as set forth in claim 20 wherein said rare earth elements are europium and samarium, said matrix is calcium fluoride and said fluorescence mode is at approximately 7085 angstrom units.

22. In an electron beam tube system having a screen for displaying an image:

a screen material including a matrix with impurity ions of two different rare earth elements therein, said ions having two rare earth ionic configurations which are reciprocally absorbing and transmitting at two different ultraviolet electromagnetic wavelength bands;

means to provide an electron beam to establish an information trace in said screen by establishing one said rare earth ionic configuration in a portion of said matrix;

means to provide an ultraviolet beam to erase said information trace in said screen by establishing the other said rare earth ionic configuration in said portion of said matrix by electron charge transfer from ions of one of said two rare earth elements to ions of the other of said two rare earth elements; and means to provide electromagnetic energy to activate a detectable physical mode in said portion of said matrix.

23. The electron beam tube system of claim 22 wherein said rare earth elements are europium and samarium.

24. The electron beam tube system of claim 23 wherein said matrix is a calcium fluoride crystalline matrix.

References Cited

UNITED STATES PATENTS

| | | | |
|---|---|---|---|
| 2,563,472 | 8/1951 | Leverenz | 350—160 X |
| 3,152,085 | 10/1964 | Ballman et al. | 252—301.4 |
| 3,250,722 | 5/1966 | Borchardt | 313—92 |
| 3,253,497 | 5/1966 | Dreyer | 315—8.5 X |
| 3,269,847 | 8/1966 | Cohen | 350—160 |
| 3,296,594 | 1/1967 | Van Heerden | 340—173 X |
| 3,341,825 | 9/1967 | Schrieffer | 340—173 |

BERNARD KONICK, *Primary Examiner.*

J. F. BREIMAYER, *Assistant Examiner.*

U.S. Cl. X.R.

88—1; 178—7.5, 7.87; 315—8.5, 12